US012765449B2

(12) United States Patent
Anderson et al.

(10) Patent No.: US 12,765,449 B2
(45) Date of Patent: Oct. 20, 2026

(54) CONTROLLING A CROP CARE IMPLEMENT BASED ON A PLURALITY OF SENTINEL PLANT CHARACTERISTICS

(71) Applicant: Deere & Company, Moline, IL (US)

(72) Inventors: Noel W. Anderson, Fargo, ND (US); Gurmukh H. Advani, West Fargo, ND (US)

(73) Assignee: Deere & Company, Moline, IL (US)

( * ) Notice: Subject to any disclaimer, the term of this patent is extended or adjusted under 35 U.S.C. 154(b) by 221 days.

(21) Appl. No.: 18/344,106

(22) Filed: Jun. 29, 2023

(65) Prior Publication Data

US 2024/0065140 A1 Feb. 29, 2024

Related U.S. Application Data

(63) Continuation-in-part of application No. 17/823,581, filed on Aug. 31, 2022, now abandoned.

(51) Int. Cl.

| | |
|---|---|
| ***A01C 21/00*** | (2006.01) |
| ***A01G 25/16*** | (2006.01) |
| ***G06V 20/10*** | (2022.01) |

(52) U.S. Cl.

CPC ............ *A01C 21/007* (2013.01); *A01G 25/16* (2013.01); *G06V 20/188* (2022.01)

(58) Field of Classification Search

CPC .... A01C 21/007; A01C 23/005; A01G 25/16; A01M 7/0089; G06V 20/188

USPC ............................................................ 701/50

See application file for complete search history.

(56) References Cited

U.S. PATENT DOCUMENTS

| | | | | |
|---|---|---|---|---|
| 8,063,774 | B2 | 11/2011 | Anderson | |
| 10,986,827 | B2 | 4/2021 | Aronov et al. | |
| 2017/0223947 | A1 * | 8/2017 | Gall | G01N 21/4738 |
| 2020/0072809 | A1 | 3/2020 | Bhanu et al. | |

(Continued)

FOREIGN PATENT DOCUMENTS

| | | | |
|---|---|---|---|
| BR | 112021012307 | A2 | 9/2021 |
| BR | 112021025653 | A2 | 2/2022 |

(Continued)

OTHER PUBLICATIONS

A plant nitrophily index based on plant leaf area response to soil nitrogen availability (Year: 2014).*

(Continued)

*Primary Examiner* — Khoi H Tran

(74) *Attorney, Agent, or Firm* — Lucian Wayne Beavers; Patterson Intellectual Property Law, PC

(57) ABSTRACT

A work vehicle includes an implement coupled to the work vehicle. A global positioning system is communicatively coupled to the work vehicle and is configured for generating a location signal indicative of a location of the work vehicle. At least one sensor is communicatively coupled to the work vehicle and configured for generating first and second sentinel plant characteristic signals indicative of first and second sentinel plant characteristics. A control system is communicatively coupled to the work vehicle and configured to receive the location signal, the first and second sentinel plant characteristic signals, determine an implement action based on a function including the first and second sentinel plant characteristics as variables, and control the implement to execute the implement action in the field.

9 Claims, 7 Drawing Sheets

(56) References Cited

U.S. PATENT DOCUMENTS

| | | | | |
|---|---|---|---|---|
| 2020/0200683 | A1 | 6/2020 | Aronov et al. | |
| 2020/0396976 | A1* | 12/2020 | Aronov | G06V 20/188 |
| 2021/0235682 | A1 | 8/2021 | Aronov et al. | |
| 2021/0243950 | A1* | 8/2021 | Blank | A01M 21/02 |
| 2022/0003677 | A1 | 1/2022 | Aronov et al. | |
| 2022/0151215 | A1 | 5/2022 | Aronov et al. | |
| 2022/0167551 | A1 | 6/2022 | Anderson et al. | |
| 2022/0174933 | A1* | 6/2022 | Smith | A01M 7/0089 |
| 2024/0046187 | A1* | 2/2024 | Xu | G06Q 10/0637 |

FOREIGN PATENT DOCUMENTS

| | | | | |
|---|---|---|---|---|
| CA | 3124561 | A1 | 6/2020 | |
| CA | 3144077 | A1 | 12/2020 | |
| CN | 113490746 | A | 10/2021 | |
| CN | 114207672 | A | 3/2022 | |
| EP | 3897107 | A2 | 10/2021 | |
| EP | 3987437 | A1 | 4/2022 | |
| TW | 202119907 | A * | 6/2021 | A01C 7/20 |
| WO | 2020132364 | A2 | 6/2020 | |
| WO | 2020132364 | A3 | 7/2020 | |
| WO | 2020257791 | A1 | 12/2020 | |

OTHER PUBLICATIONS

Moreau, Milard, Munier-Jolain ("A plant nitrophily index based on plant leaf area response to soil nitrogen availability", Agronomy for Sustainable Development 33:8090815, Jul. 2014 (Year: 2014).*

Delphine Moreau, Guillaume Milard, Nicolas Munier-Jolain. "A plant nitrophily index based on plant leaf area response to soil nitrogen availability." Agronomy for Sustainable Development, Springer Verlag/EDP Sciences/INRA, 2013, 33 (4), pp. 809-815.

Agvise Laboratories: Interpreting A Soil Test Report, https://www.agvise.com/wp-content/uploads/2020/08/guide-soil-interpretation-report-2019.pdf.

Systemic Uptake of Fluorescent Tracers by Soybean (Glycine max (L.) Merr.) Seed and Seedlings, Wang et al., Agriculture 2020, Jun. 26, 2020.

Frost of Freeze Damage to Immature Corn, R. Nielsen, https://www.agry.purdue.edu/ext/corn/news/timeless/FrostFreezeImmatureCorn.html (Oct. 2019)(4 pages).

Options for Frost Damaged Corn, J. Ransom http://miv.ext.nodak.edu/agriculture/ag-hub/ag-topics/crop-production/crops/corn/options-frost-damaged-corn (at least as early as Dec. 2022)(3 pages).

Premature Frost Damage to Crops, J. Rees https://cropwatch.unl.edu/2022/premature-frost-damage-crops (Oct. 14, 2022) (8 pages).

Planning the Fall Vegetable Garden, C. Campbell, https://piedmontmastergardeners.org/article/planning-the-fall-vegetable-garden/ (Jul. 2016)(5 pages).

2019-2020 Corn Growing Degree Days, J. Miller (Sep. 23, 2020) https://sites.udel.edu/agronomy/2020/09/23/2019-2020-corn-growing-degree-days/ (6 pages).

Crop Residue Decomposition and Nitrogen Mobilization, https://www.channel.com/en-us/agronomy/crop-residue-decomposition-and-nitrogen-mobilization.html (Dec. 8, 2018)(5 pages).

Systemic Uptake of Fluorescent Tracers by Soybean Seed and Seedlings, Z. Wang https://www.mdpi.com/2077-0472/10/6/248 (Jun. 26, 2020)(27 pages).

Altered Nitrogen Availability in Pea-Barley Sole- and Intercrops Changes Dominance of Two Nitrophilic Weed Species, J. Ortrud file:///C:/Users/lwb.AD/Downloads/agronomy-11-00679.pdf (2021)(19 pages).

Cover Crops Can Work In Western Kansas Cropping Systems, https://www.covercropstrategies.com/articles/1797-cover-crops-can-work-in-western-kansas-cropping-systems (Apr. 9, 2021)(3 pages).

Wikipedia, Sentinel species, (Jun. 2023, admitted to be prior art)(6 pages).

Why are rose bushes planted in vineyards, http://www.entrevinosypagos.com/en/plantamos-rosas-los-vinedos/ (Apr. 30, 2019)(2 pages).

The value of sentinel plants for risk assessment and surveillance to support biosecurity, S. Mansfield, NeoBiota 48:1-24 (Jul. 2, 2019)(24 pages).

* cited by examiner

FIG. 6
High soil N
Mid soil N
Low soil N
Leaf Area
(b)
(a)
Growing Degree Days (GDD)
a
b
c
d
e
h

CONTROLLING A CROP CARE IMPLEMENT BASED ON A PLURALITY OF SENTINEL PLANT CHARACTERISTICS

COPYRIGHT NOTICE

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

FIELD OF THE DISCLOSURE

The present disclosure generally relates to controlling a crop care implement of a work vehicle and more particularly to controlling an implement of the work vehicle using sentinel plants in a field.

BACKGROUND OF THE DISCLOSURE

Work vehicles with implements include crop care machines such as a sprayer that is generally used to deliver a substance to a field using a plurality of nozzles. Sprayers may be self-propelled or pulled by another work vehicle.

SUMMARY OF THE DISCLOSURE

In one embodiment, a work vehicle configured for operating in a field for growing a crop is disclosed. The work vehicle comprises an implement coupled to the work vehicle. A global positioning system is communicatively coupled to the work vehicle. The global positioning system is configured for generating a location signal indicative of a location of the work vehicle. At least one sensor is communicatively coupled to the work vehicle. At least one sensor is configured for sensing first and second sentinel plant characteristics and generating first and second sentinel plant characteristic signals indicative of the first and second sentinel plant characteristics. A control system is communicatively coupled to the work vehicle. The control system is configured to receive the location signal, receive the first and second sentinel plant characteristic signals, determine an implement action based on a function including the first and second sentinel plant characteristics as variables, and control the implement to execute the implement action in the field.

In another embodiment, a method of controlling a work vehicle is disclosed. The method comprises sensing a first sentinel plant characteristic of a first sentinel plant; sensing a second sentinel plant characteristic of the first sentinel plant or of a second sentinel plant; automatically determining an implement action based on a function including the first and second sentinel plant characteristics as variables; and automatically controlling the implement to execute the implement action.

Other features and aspects will become apparent by consideration of the detailed description and accompanying drawings.

Before any embodiments are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Further embodiments of the invention may include any combination of features from one or more dependent claims, and such features may be incorporated, collectively or separately, into any independent claim.

As used herein, unless otherwise limited or modified, lists with elements that are separated by conjunctive terms (e.g., “and”) and that are also preceded by the phrase “at least one of” or “one or more of” indicate configurations or arrangements that potentially include individual elements of the list, or any combination thereof. For example, “at least one of A, B, and/or C” or “one or more of A, B, and/or C” indicates the possibilities of only A, only B, only C, or any combination of two or more of A, B, and C (e.g., A and B; B and C; A and C; or A, B, and C).

DETAILED DESCRIPTION

Figure 1:
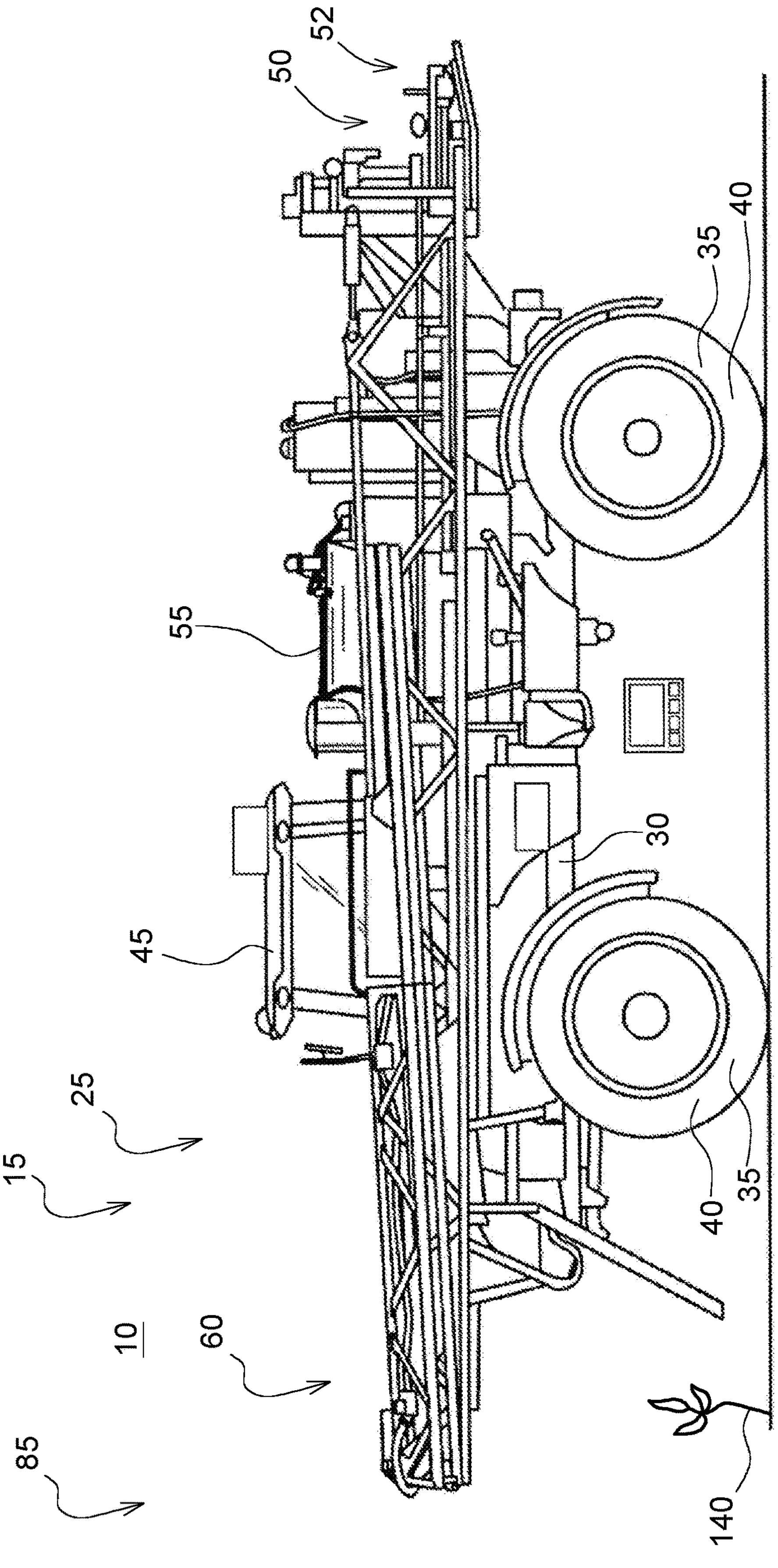
FIG. 1 is a side view of a self-propelled sprayer.

FIG. 1 illustrates a work vehicle 10. The illustrated work vehicle 10 is a crop care machine in the form of a sprayer 15 configured for spraying crops on a field or surface 20. Other types of work vehicles 10, including other types of crop care machines, are contemplated by this disclosure including construction equipment (e.g., wheel loader, crawler), road building equipment (e.g., motor grader), forestry equipment (e.g., tracked feller buncher) and agricultural equipment (e.g., chisel plow).

The illustrated sprayer 15 is a self-propelled sprayer 25. Other types of sprayers 15 are contemplated by this disclosure (e.g., pull behind sprayer, dry spreader). The self-propelled sprayer 25 comprises a frame 30. The frame 30 is supported by at least one ground-engaging element 35. The ground-engaging element 35 may be a wheel 40 or a track (not shown). An operator station 45 is also capable of being coupled to the frame 30.

An implement 50 is coupled to the frame 30. The illustrated implement 50 may be a spray assembly 52 that comprises a tank 55 that comprises a volume for storing at least one substance (e.g., chemical) to be dispensed on the surface 20. Alternatively, the tank 55 may comprise a plurality of separate volumes for providing a plurality of potentially different substances. For example, one substance may be an herbicide while another substance might be a fungicide or pesticide. The one or more substances can be selected to manage attributes of the soil or crop, such as soil fertility, soil quality, water, weeds, pests, diseases, biodiversity, wildlife, and other attributes.

Figure 2:
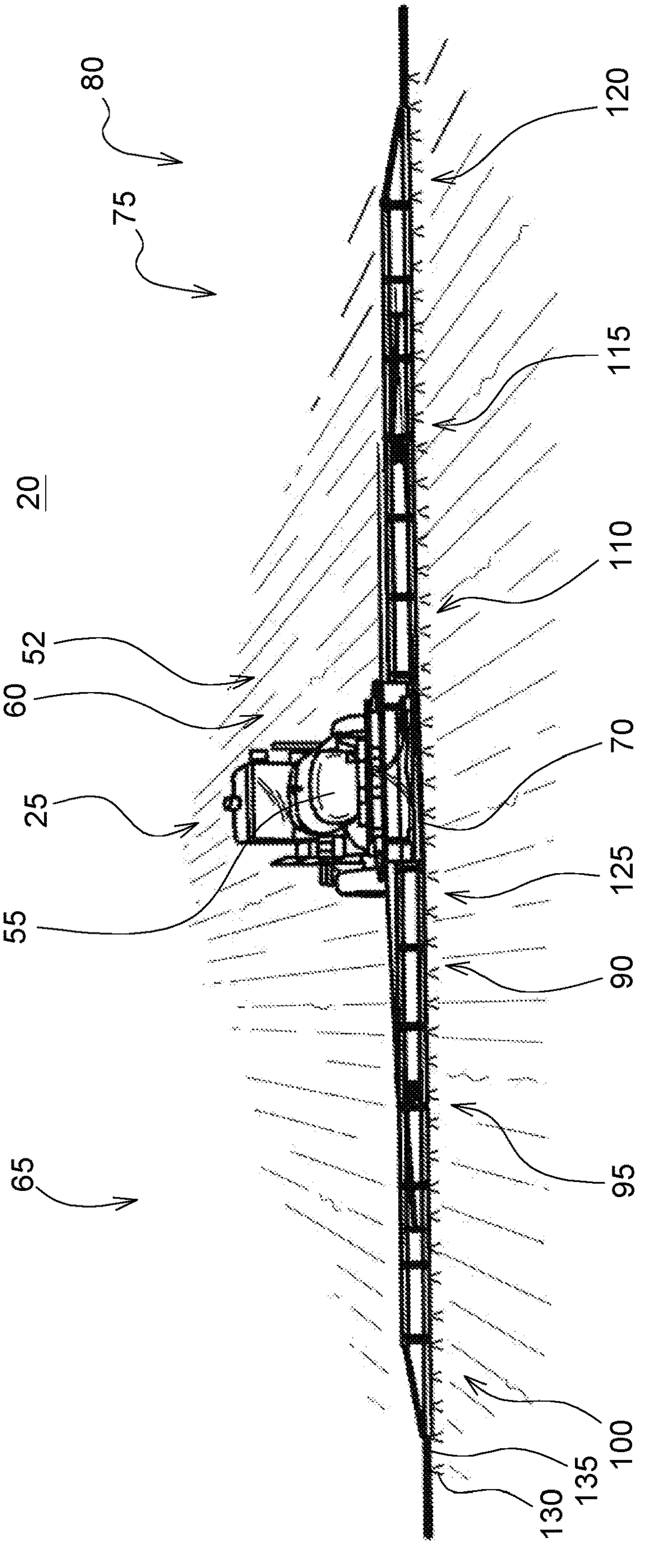
FIG. 2 is a rear view of the self-propelled sprayer of FIG. 1.

The spray assembly 52 further comprises a boom assembly 60 that is in fluid communication with the tank 55. With reference to FIG. 2, the boom assembly 60 comprises a left boom 65, a center frame 70, and a right boom 75. Other boom assembly 60 configurations are contemplated by this disclosure. The boom assembly 60 is configured to unfold into a working configuration 80 for spraying the substance onto the surface 20 and fold into a transport configuration 85 (FIG. 1) when not spraying.

In the illustrated configuration, the left boom 65 comprises a left inner boom 90 that is coupled to the center frame 70. A left center boom 95 is coupled to the left inner boom 90. A left outer boom 100 is coupled to the left center boom 95. Other left boom 65 configurations are contemplated by this disclosure. In the working configuration 80, the left inner boom 90 is placed into an end-to-end relationship in a longitudinal direction 105 with the left center boom 95 while the left outer boom 100 is also placed into an end-to-end relationship in the longitudinal direction 105 with the left center boom 95. In the transport configuration 85, the left outer boom 100 is folded into a facing relationship, and is parallel with, the left center boom 95. The left center boom 95 is folded into a facing relationship, and is parallel with, the left inner boom 90.

In the illustrated configuration, the right boom 75 comprises a right inner boom 110 that is coupled to the center frame 70. A right center boom 115 is coupled to the right inner boom 110. A right outer boom 120 is coupled to the right center boom 115. Other right boom 75 configurations are contemplated by this disclosure. In the working configuration 80, the right inner boom 110 is placed into an end-to-end relationship in the longitudinal direction 105 with the right center boom 115 while the right outer boom 120 is also placed into an end-to-end relationship in the longitudinal direction 105 with the right center boom 115. In the transport configuration 85, the right outer boom 120 is folded into a facing relationship, and is parallel with, the right center boom 115. The right center boom 115 is folded into a facing relationship, and is parallel with, the right inner boom 110.

A nozzle assembly 125 is coupled to the left boom 65, the center frame 70, and the right boom 75. The nozzle assembly 125 comprises a plurality of nozzles 130 and a plurality of conduits 135 for delivering the substance from the tank 55 to the plurality of nozzles 130. The nozzle assembly 125 is configured to deliver the substance to a plant 140 (FIG. 1) one at a time or to a plurality of plants 140 at one time. Other types of applicators besides nozzles 130 are contemplated by this disclosure (e.g., drop applicators). In general, each nozzle 130 may be described as an implement for applying a substance under rate control of an actuator, the actuator being a valve associated with the nozzle. Other examples of substances applied under rate control of an actuator could include the following: (1) a planter applying seeds under rate control of a seed meter; (2) a fertilizer applicator applying fertilizer under rate control of a granular or liquid meter; (3) a pesticide applicator applying pesticide under rate control of a spray nozzle or fogger; or (4) a pivoting irrigator applying water under rate control of a valve.

Figure 3:
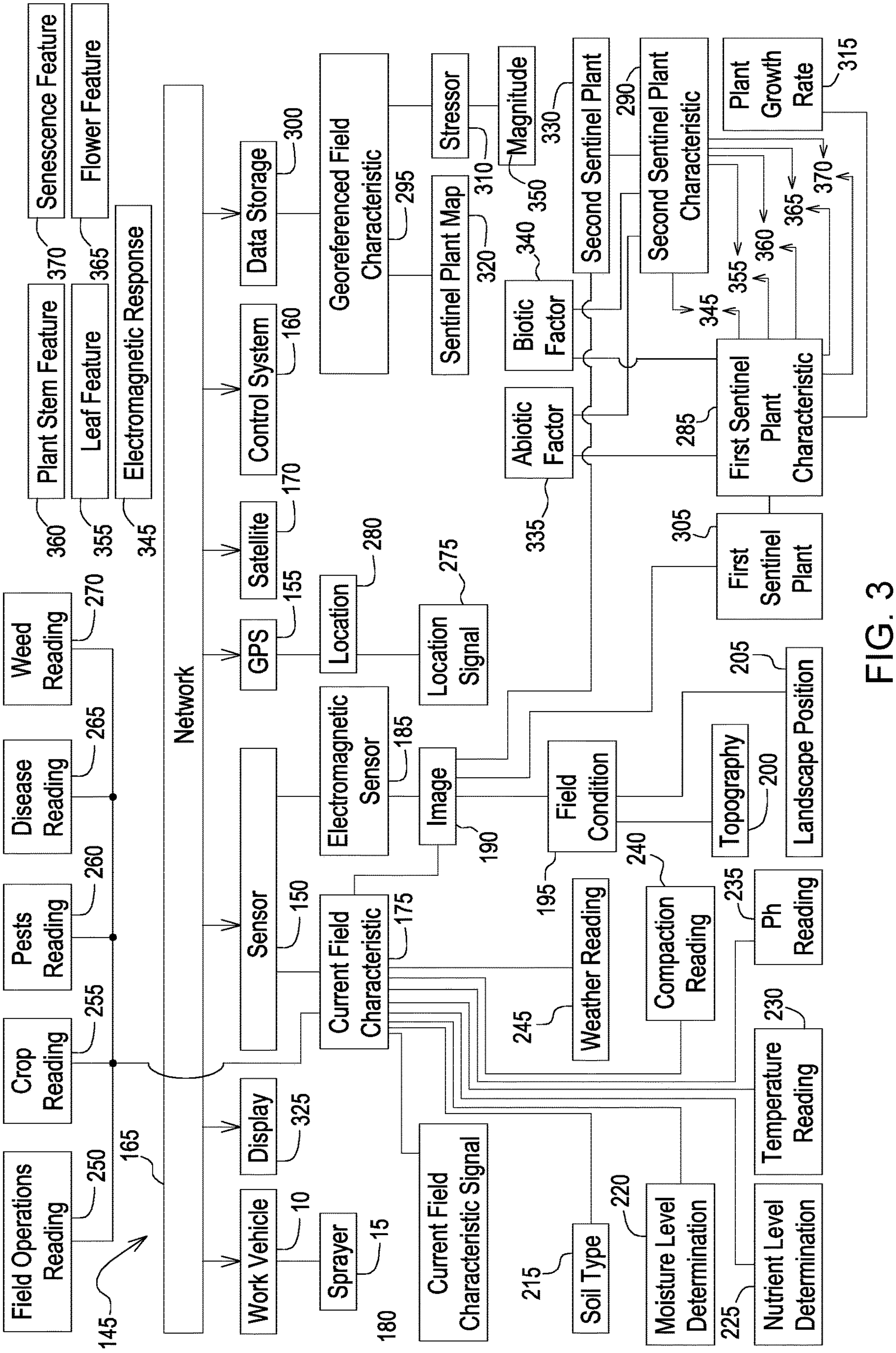
FIG. 3 is a block diagram of a sprayer.

Referring to FIG. 3, a block diagram is provided of one example of a computing architecture 145 that includes the sprayer 15, a sensor 150, a global positioning system ("GPS") 155, and a control system 160. Global positioning system 155 may comprise a Global Navigation Satellite System (GNSS), a terrestrial radio triangulation system, or any other system which is able to provide the location of the sprayer 15 in the field 20 in global or local coordinates. FIG. 3 illustratively shows that the sprayer 15, the sensor 150, the GPS 155, and the control system 160 are connected over a network 165. Thus, computing architecture 145 operates in a networked environment, where the network 165 includes any of a wide variety of different logical connections such as a local area network (LAN), wide area network (WAN), controller area network (CAN) near field communication network, satellite communication network, cellular networks, or a wide variety of other networks or combination of networks. It is also noted that the control system 160 can be deployed on the sprayer 15 such that the control system 160 performs the operations described herein without a networked connection. In addition, while the present description will primarily focus on an example of the control system 160 communicating with the sprayer 15, it is noted that the same or similar functionality can be provided when communicating with a wide variety of work vehicles 10 and/or remote systems. Work vehicles 10 may comprise without limitation, planters, seeders, chemical applicators, sprayer, rotary hoes, plows, disks, harvesters, soil samplers, scouting robots, or unmanned aerial vehicles.

The sensor 150 may be communicatively coupled to the work vehicle 10. For example, the sensor 150 may be coupled to the sprayer 15 or it may be coupled to a satellite 170 that communicates with the work vehicle 10 or control system 160. In some examples, the satellite 170 may comprise a manned aircraft or unmanned aerial vehicle as a remote sensor platform. The sensor 150 may be configured for sensing a current field characteristic 175 and generating a current field characteristic signal 180 indicative of the current field characteristic 175. The sensor 150 may include an electromagnetic sensor 185 and the current field characteristic 175 may include an image 190 that depicts a field condition 195. The image 190 may be 2D or 3D. The image 190 may comprise a single pixel or data value. The image 190 may comprise a sentinel plant characteristic such as the first sentinel plant characteristic 285 or the second sentinel plant characteristic 290. The electromagnetic sensor 185 may be a camera or other imaging sensor such as a video camera. Alternatively, the sensor 150 may include at least one of a radar, lidar, laser-based sensors, LIDAR based sensors, temperature sensors, soil property sensors, NIR sensor, visible light sensor, UV sensor, gas or chemical sensors and a wide variety of other imaging or other sensing systems.

The current field characteristic 175 may include the image 190 that depicts the field condition 195 such as a topography 200 of the surface 20 or a landscape position 205 of plants 140 or a size of the plant 140 patches. The current field characteristic 175 may also include soil type 215 such as clay composition or topsoil composition. The current field characteristic 175 may include a moisture level determination 220 such as 20-80% water content or a nutrient level determination 225 that includes a level of soil organic matter, or residue cover, or cover crops. Additionally, the current field characteristic 175 may include a temperature reading 230 of the surface 20 at a soil depth or a pH reading 235 of the soil of the surface 20.

The current field characteristic 175 may include a compaction reading 240 of the surface 20 that includes compaction layer details such as depth of the compaction and compaction drainage and its location in the surface 20. Additionally, the current field characteristic 175 may include a weather reading 245. The weather reading 245 may include past, present, and future temperatures, precipitation, relative humidity, moisture, solar, sun angle, sunlight attenuation by clouds or other factors such as smoke or dust, day length, or other environmental factors.

The current field characteristic 175 may include a field operations reading 250 that indicates machinery data including machinery settings or timing of machinery operations along with the location in the surface 20. Additionally, the current field characteristic 175 may include a crop reading 255 that indicates crop details including mono or multiple varieties that are planted in the surface 20 and their location. The current field characteristic 175 may include a pests reading 260 including an indication of any insects, mammals, birds, or other similar biotic factors and their location in the surface 20. The current field characteristic 175 may include a disease reading 265 including an indication of any bacteria, molds, smuts, viruses or other similar biotic factors and their location in the field. The current field characteristic 175 may include a weed reading 270 including an indication of any weeds and weed seeds and their location in the surface 20. Other current field characteristics 175 are contemplated by this disclosure.

The GPS 155 is communicatively coupled to the sprayer 15. The GPS 155 is configured for generating a location signal 275 indicative of a location 280 of the sprayer 15 or work vehicle 10. Generally, the GPS 155 receives sensor signals from one or more sensors, such as a GPS receiver, a dead reckoning system, a LORAN system, or a wide variety of other systems or sensors, to determine the location 280 of the sprayer 15 across the surface 20.

The control system 160 is in communication with the sensor 150 and the GPS 155. The control system 160 is communicatively coupled to the sprayer 15. The control system 160 may be configured to receive a first sentinel plant characteristic 285, receive a second sentinel plant characteristic 290, receive the location signal 275, the current field characteristic 175, receive a georeferenced field characteristic 295 from a data storage 300, and control at least one of the plurality of nozzles 130 based on at least one of the first sentinel plant characteristic 285, the second sentinel plant characteristic 290, the location 280, the current field characteristic 175, or the georeferenced field characteristic 295, or any combination thereof. In other embodiments, the control system 160 may control other implement 50 actions such as a substance application location or rate. The georeferenced field characteristic 295 may include a depth and spacing information for the plants 140 based on how they were planted in a previous operation or based on historical data for the field or surface 20. The georeferenced field characteristic 295 may include relationships between first and second sentinel plant characteristics 285, 290 that can be sensed and the georeferenced field characteristics 295 that promote a degree or a magnitude 350 of response to a stressor 310.

The control system 160 may be configured to control the plurality of nozzles 130 to spray at or near a first sentinel plant 305 at the location where the georeferenced field characteristic 295 indicates the stressor 310 for the first sentinel plant characteristic 285. For example, the georeferenced field characteristic 295 may indicate an area or location of the surface 20 where there is or may be a high incidence of an insect. The control system 160 may control the plurality of nozzles 130 to spray at or near the first sentinel plant 305 that has the first sentinel plant characteristic 285 that is elicited by the insect at this location. The first sentinel plant characteristic 285 may be a slow plant growth rate 315.

In an additional example, the georeferenced field characteristic 295 may indicate an area of the surface 20 where there is a high probability of soybean chlorosis in some years. The control system 160 may control the plurality of nozzles 130 to spray at or near the first sentinel plant 305 that has the first sentinel plant characteristic 285 that is elicited by difficulties in plant uptake of iron, resulting in chlorosis, at this location. The first sentinel plant characteristic 285 may be a yellowing of leaves proportional to the severity of the stress. Mitigation could be to apply chelated iron and maybe sulfur with the sprayer 15, the work vehicle 10, or other equipment.

The georeferenced field characteristic 295 may include a sentinel plant map 320 and the control system 160 may be configured to update the sentinel plant map 320 and the georeferenced field characteristic 295 in the data storage 300 with the current field characteristic 175. In some examples, sentinel plant map 320 comprises locations where sentinel plants were planted in the past. This data may be used to correctly identify and interpret images 190 containing first and second sentinel plant characteristics 285, 290. The sensor 150 may be used to obtain the data stored in the data storage 300. The data storage 300 may be coupled to the sprayer 15, the work vehicle 10, or the satellite 170, or may be located at some other location. In some examples, satellite 170 may comprise a manned aircraft or unmanned aerial vehicle as a remote sensor platform.

A display 325 may be provided for displaying the sentinel plant map 320 to an operator. Additionally, the operator may enter sprayer 15 or work vehicle 10 commands via the display 325. Display 325 may include audio elements such as a speaker or microphone. Display 325 may include haptic elements such as a vibration generator.

A planter (not shown) may be used to plant the first sentinel plant 305 or seed, a second sentinel plant 330 or seed, and other seeds in proximity of, or near, the first sentinel plant 305 and/or the second sentinel plant 330. The first and second sentinel plants 305, 330 exhibit different characteristics when presented with the stressor 310. The different first sentinel plant characteristic 285 and second sentinel plant characteristic 290 can be any detectable plant attribute that is proportional to the stressor 310 such as an abiotic factor 335 or a biotic factor 340. For example, the abiotic factor 335 may be a lack of or an abundance of water, humidity, light, nutrients, or minerals. The abiotic factor 335 may also be soil conditions or temperature. The biotic factor 340 may be the presence of a certain fungus, bacteria, or insect.

For example, the first and second sentinel plants 305, 330 may be genetically modified corn or soy beans that exhibit different characteristics from the other corn or soy beans that the first and second sentinel plants 305, 330 are planted with, respectively. In one example of genetic modification, sentinel plants may be modified to produce green fluorescent protein ("GFP") in response to a stressor. In other examples, the seed may naturally have or be traditionally bred to have a differentiated characteristic response to a stressor 305. The planter may be configured for planting the first sentinel plant 305 that exhibits the first sentinel plant characteristic 285. The first sentinel plant 305 may be a sentinel seed (not shown) or a sentinel seedling (not shown) or any other sentinel plant form. A sentinel plant may also be a fungus, a lichen, mold, or any other stationary life form. The planter may also be configured for planting the second sentinel plant 305 that exhibits the second sentinel plant characteristic 290. The second sentinel plant characteristic 290 may be the same as the first sentinel plant characteristic 285 or it may vary. The second sentinel plant 330 may be a sentinel seed (not shown) or a sentinel seedling (not shown) or any other sentinel plant form. A sentinel plant may also be a fungus, a lichen, mold, or any other stationary life form.

In one embodiment, the first or second sentinel plant characteristic 285, 290 may include at least one of varying intensity of electromagnetic response 345 generated by the first or second sentinel plant 305, 330 or the plant growth rate 315 that correspond to a magnitude 350 of the stressor 310. The electromagnetic response 345 may be an absorption, transmission, backscatter, reflectance, fluorescence, bioluminescence, or other. The electromagnetic response 345 may be induced with or without external stimulation.

In another embodiment, the first or second sentinel plant characteristic 285, 290 may include a varying intensity of a chemical marker response generated by the first or second sentinel plant 305, 330. The chemical marker may be in gas or vapor form. The varying intensity of the chemical marker may include information representative of at least one of a stressor or a magnitude of the stressor of the first sentinel plant or of a response of the plant to the stressor.

In another embodiment, the first or second sentinel plant characteristic 285, 290 may include a change in a leaf feature 355 such as a change in leaf size, color, color pattern, shape, area index, or temperature. Other leaf features 355 are contemplated by this disclosure.

In yet another embodiment, the first or second sentinel plant characteristic 285, 290 may include a change in a plant stem feature 360 such as a change in plant stem height, plant stem biomass, plant stem formations or malformations, plant stem diameter, plant stem color, or plant stem color pattern. Other plant stem features 365 are contemplated by this disclosure. Attributes such as plant stem diameter may be measured by sensors or by mechanical measurement techniques.

The first or second sentinel plant characteristic 285, 290 may include the slow plant growth rate 315 or otherwise altered growth rate, or a time to emergence, seed germination rate, or an initiation of reproductive phase.

In another embodiment, the first or second sentinel plant characteristic 285, 290 may include a change in a flower feature 365 such as flower color or flower bloom timing. Other flower features 365 are contemplated by this disclosure.

In yet another embodiment, the first or second sentinel plant characteristic 285, 290 may include a senescence feature 370 such as death of the sentinel plant due to daylight, a daylight change derivative, a change in temperature, a soil chemical attribute, diseases/infestation or other. Other first or second sentinel plant characteristics 285, 290 are contemplated by this disclosure.

Figure 4:
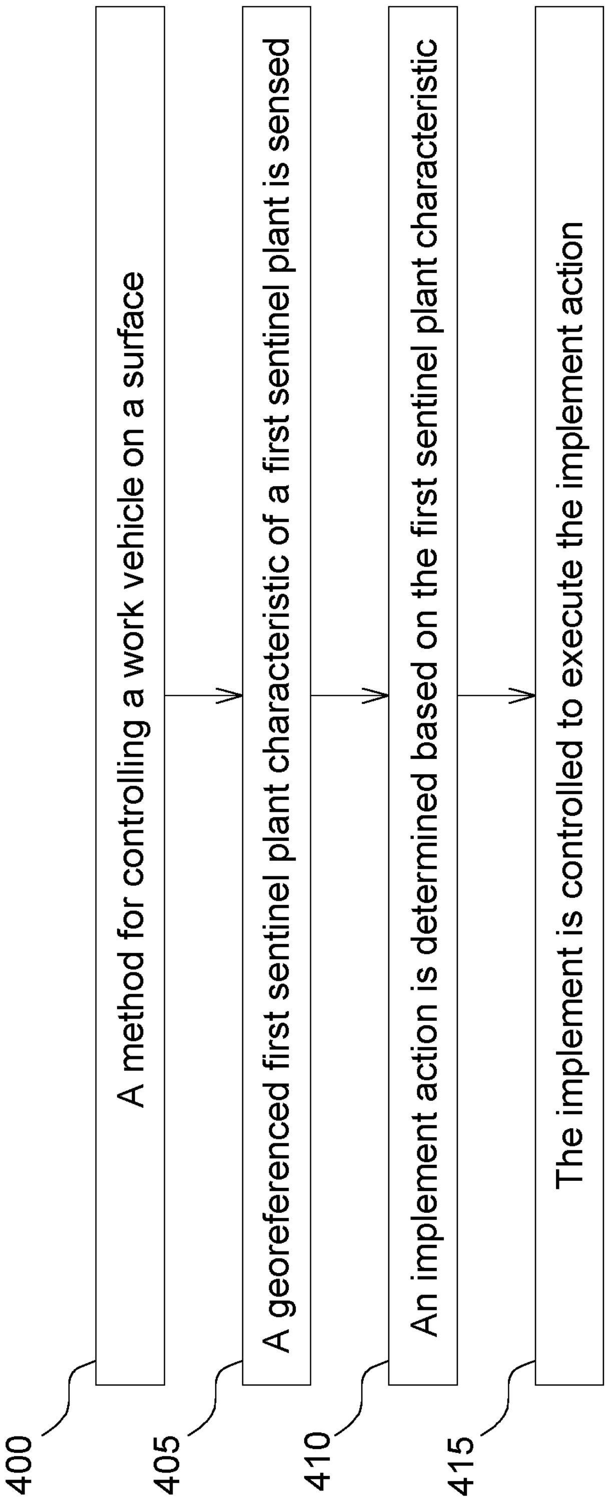
FIG. 4 is a flow diagram of a method for operating a work vehicle.

Referring now to FIG. 4, a flow diagram of a method 400 for controlling a work vehicle 10 on a surface 20 is provided. At 405, a georeferenced first sentinel plant characteristic 295 of a first sentinel plant 305 is sensed. At 410, an implement 50 action is determined based on the first sentinel plant characteristic 295. At 415, the implement 50 is controlled to execute the implement 50 action.

The first sentinel plant characteristic 285 may comprise an image 190 of the first sentinel plant 305 that includes at least one of the stressor 310 or the magnitude 350 of the stressor 310 of the first sentinel plant 305. The stressor 310 may comprise at least one of an abiotic factor 335 or a biotic factor 340. The first sentinel plant characteristic 285 may comprise at least one of varying intensities of an electromagnetic response 345 generated by the first sentinel plant 305 or a plant growth rate 315 that corresponds to the magnitude 350 of the stressor 310. The electromagnetic response 345 may be an absorption, transmission, backscatter, reflectance, fluorescence, bioluminescence, or other. The implement 50 may comprise at least one of a plurality of spray nozzles 130 and the implement action may comprise spraying a substance through at least one of a plurality of spray nozzles 130. The substance may be a liquid or a solid. Other implement actions are contemplated by this disclosure.

Advantageously, the first or second sentinel plants 305, 330 would not need to be planted at the same time as the main crop. They could be planted at, say, the time of spring tillage ahead of the crop planting pass. They could also be planted after the main crop. In one example, a problem is otherwise identified in the surface 20 and then the first or second sentinel plants 305, 330 are planted to play a diagnostic role to find out why the stand is poor or lagging. In another example, the first or second sentinel plants 305, 330 could be planted just prior to a critical crop phase such as pollination to provide data on conditions during a time window. The first or second sentinel plants 305, 330 could also be perennials planted once for multiple seasons of use for annual crops or multi-year crops like cane sugar.

The first or second sentinel plants 305, 330 could be an organism, other than plants, such as bacteria or fungi (some soil fungi in the tropics are naturally fluorescent). The response of the sentinel organisms could be detected by sensors on a ground engaging element such as a shank. Similarly, the response to the stressor 310 by the first or second sentinel plants 305, 330 may be in the roots and observed below ground.

The first or second sentinel plants 305, 330 could depend on allelopathy. A first plant, micro, fungi could be the one which is proportionally responsive to the stressor 310. The response may be in the form of proportionally altering the environment around a second plant. The second plant then communicates the level of that alternate environment. For example, in response to a soil condition, a microbe alters the pH of the soil adjacent to it. This causes a color change in the flower of a co-located plant sensitive to soil pH. A liquid may be precisely applied in the seed trench and planting the first or second sentinel plants 305, 330 may comprise placing a seed and inoculating the soil near the seed with bacteria, fungi, etc. The inoculant wouldn't even need to be alive. It could be the first plant is replaced by a chemical that reacts with one or more soil components, living or non-living, that results in a proportional amount that is reported via the second plant. Chemical may be applied as a liquid, solid, or gas. Also note that the reporter plant response can be other things besides fluorescence such as a nitrogen level experienced by a microbe, a local soil pH level, or a plant flower or leaf color.

Machine learning could be used to improve the efficacy of where to plant plants 210 including the first or second sentinel plants 305, 330. The ability of the sentinel plants to accurately sense desired crop conditions, in some cases compared to laboratory analysis or other sensing means, may be improved with machine learning. This improvement could be in the selection of varieties to use as sentinels, planting attributes (e.g., interplant spacing, depth), or location of individual plants 210 or plant 210 patches.

In one example, sprayer 15 is moving across surface 20. Electromagnetic sensor 185 captures an image 190, which includes plant 140. Plant 140 is georeferenced with location 280 from GPS 155 by control system 160. Control system 160 accesses sentinel plant map 320 and determines that plant 140 is first sentinel plant 305. Control system 160 analyzes image 190 using sentinel plant information in data storage 300. Crop reading 255, shade and coverage of yellow in leaves, is consistent with a stressor 310 of magnitude 350 for iron chlorosis. Control system 160 then retrieves corresponding remediation prescription from data storage 300 and commands sprayer 15 to apply an amount of chelated iron to crop in vicinity of plant 140.

In some examples, GPS 155 provides a global position location for the location of the work machine or for a component of the work machine such as a spray nozzle. GPS 155 may also be used to identify a global position for a treatment location. In some other examples, GPS 155 may provide a local relative position of a location to treat and a location in the field of view of a sentinel plant characteristic sensor. When the speed of the work machine is known, the relative locations may be used to determine a time between image capture and actuator (eg nozzle) activation.

Control Based on a Plurality of Sentinel Plant Characteristics:

The following discussion explains how control can be based on a first and second sentinel plant characteristics, and more generally on a plurality of sentinel plant characteristics. The first and second sentinel plant characteristics may be from a first sentinel plant or from first and second sentinel plants of a single plant genotype. The first and second sentinel plant characteristics may be from first and second sentinel plants of first and second plant genotypes, respectively. Plants of different plant "genotypes" can include without limitation, different plant varieties, different plant cultivars, different plant hybrids, or different plant species.

The control may be based on a function including the first and second sentinel plant characteristics as variables. The function may be a ratio wherein the numerator is derived from the first sentinel plant characteristic and the denominator is derived from the second sentinel plant characteristic.

Sentinel plants may report one-time events, cumulative events, conditions at different soil depths, baselines, and other. In some examples, two or more sentinel plant varieties may be combined to provide actionable information.

Crop varieties are typically bred and selected for hardiness to environmental conditions. While they may not show much environmental stress compared to a less tolerant variety, that does not mean that the crop is unaffected. In some examples, sentinel plants which are less tolerant to stress or more responsive to environmental characteristics provide beneficial information about crop which has undergone or is undergoing stress.

One example of a onetime event is daylength. Some plants produce substances based on photoperiodic cycle. This feature can then trigger events in the plant such as flowering. One of the better known examples is the flowering of *Arabidopsis* tied to daylength. Thus, the flowering of such a sentinel plant can tie other data to known daylength and calendar data.

Another example of a onetime event is cold. Early frosts can damage crops such as corn and soybeans. Temperatures can vary across a field based on factors such as topography, cloud cover, and wind. Frost and freeze damage to sentinel plants with varying degrees of cold sensitivity may be used to indicate the temperatures experienced by nearby crop. Cold event sentinel plants may be visually assessed based on degree of frost damage or by death. The data, which may be qualitative such as none, slight, mild, and severe, may be used to assess cold damage to a crop. In the fall, corn frost damage information as provided by or enhanced with sentinel plants, may be used to select between harvesting the crop for silage or grazing vs harvesting for grain. It can also guide harvest logistics. In the spring, the information may be used for replant decisions. Having a sentinel plant that shows the magnitude of cold weather quickly can lead to an earlier replant decision and actual replanting compared to waiting and observing the damaged crop.

An example of a cumulative event is growing degree days (GDD). Some crops such as corn show a strong correlation between crop growth stage and cumulative growing degree days. Thus, corn plant growth stage can be used as a crop development normalization factor for use with other data such as leaf area and leaf area index with nitrophilic plants.

Example: Differential Response: Leaf Area Index of Nitrophilic and Non-Nitrophilic Plants One example of controlling a crop care implement based on multiple sentinel plant characteristics is based on a differential response in the leaf area index of nitrophilic and non-nitrophilic plants. Leaf Area and Leaf Area Index (LAI) are metrics that may be used to measure plant response to environmental characteristics such as nutrients. Moreau, Millard, and Munier-Jolain have demonstrated this for soil nitrogen availability. ("A plant nitrophily index based on plant leaf area response to soil nitrogen availability", Agronomy for Sustainable Development 33:8090815, July 2014) In their example, the leaf area of a nitrophilic plant relative to a non-nitrophilic plant was indicative of relative soil nitrogen. This data could be used to guide in-season nitrogen application. The use of a reference plant, eg a non-nitrophilic plant as in the paper or a GDD crop described above, can help distinguish leaf area tied to growth stage size vs leaf area related to the soil N characteristic.

Figure 5:
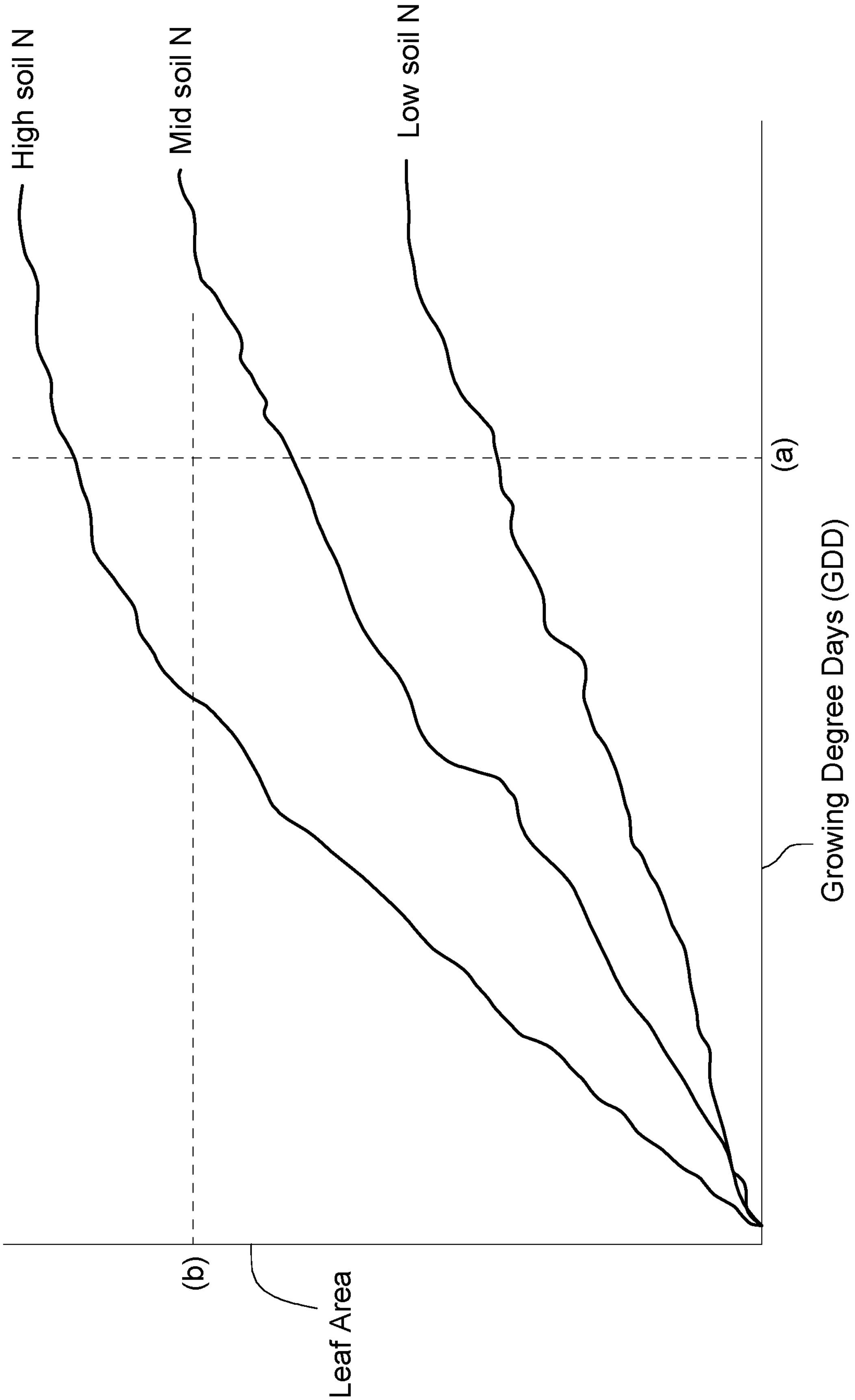
FIG. 5 is a schematic depiction of leaf area as a function of GDD and soil nitrogen levels.

In one example, there could be reference (eg laboratory) data to calibrate a nitrophilic plant for leaf area as a function of GDD and soil nitrogen levels. For example, high, medium, and low. The calibration could also be done with numeric values or any other suitable scale as schematically illustrated in FIG. 5.

An image(s) of a GDD plant (eg corn, *Zea mays*) and a nitrophilic plant (eg *Polygonum lapathifoliu*) are obtained. The images are analyzed to provide the GDD at the time of the image (point (a)) and the leaf area of the nitrophilic plant (point b). These two values serve as an index to the soil nitrogen level. Interpolation may be required. In this example, the soil nitrogen level lies midway between "medium" and "high". The nitrogen level may be used to control an in-season nitrogen application.

In some examples, the "high", "mid", and "low" curves may be tied to current N concentrations, initial fertilizer concentrations or rates, or other. These levels may be used with other information such as yield goals to identify a nutrient (eg nitrogen) deficiency which then is used to determine an application rate. For example, a portion of a field may have a yield goal of 200 bushels/acre requiring 200 pounds of nitrogen/acre to be available. The intersection of (a) and (b) may be calibrated to indicate a level of 160 pounds/acre. Thus the supplemental fertilizer rate should be 40 pounds/acre.

In other examples, a different plant characteristic may be used instead of leaf area. Without limitation, these characteristics include vegetative indices such as NDVI, a fluorescent protein response, or other. The use of a second sentinel plant characteristic such as GDD or leaf area may be used to calibrate the VI or fluorescent protein response to plant development or size.

In this example the first sentinel plant characteristic 285 may be the leaf area of the nitrophilic plant which is the first sentinel plant 305. The second sentinel plant characteristic 290 may be GDD as indicated by the leaf area of the non-nitrophilic plant which is the second sentinel plant 330. The function including the first and second sentinel plant characteristics as variables is represented by the graphic relationships shown in FIG. 5 indicating the relative N level of the soil. Based on the determined N level the control system 160 may automatically determine an amount of N to be added to the soil by the implement 50.

In one example comparing the leaf area of the nitrophilic plant to the leaf area of the non-nitrophilic plant at the end of the test period in both low soil N and high soil N conditions, for the low soil conditions the ratio of the leaf area of the nitrophilic plant to the leaf area of the non-nitrophilic plant was 4:1, whereas for the high soil conditions the ratio of the leaf area of the nitrophilic plant to the leaf area of the non-nitrophilic plant was 14:1. Using such data, one can compare the leaf area of the nitrophilic plant to the leaf area of the non-nitrophilic plant at a known point in the growth cycle for an area of a soil plot and determine therefrom the approximate level of soil Nitrogen in the area of the soil plot.

Example: Time Dependent Differential Response

In the example above, the GDD and nitrophilic plant data were for a single point in time. In another example, data may be collected over a period of time to observe changes in soil nitrogen levels as microorganism tie up nitrogen during residue decomposition and then as crop, such as corn, takes up nitrogen during the reproductive phase of its life cycle. These two nitrogen draws have been documented for example at "Crop Residue Decomposition and Nitrogen Mobilization", Dec. 8, 2018, https://www.channel.com/en-us/agronomy/crop-residue-decomposition-and-nitrogen-mobilization.html.

Figure 6:
FIG. 6 is a schematic depiction of leaf area as a function of GDD and soil nitrogen levels showing a timed response for eight points and one or more sets of plants.

FIG. 6 schematically shows leaf area for data collected at eight different points in time, labeled a-h, determined from GDD and a nitrophilic plant images as described above. Points a-c show relative declining soil nitrogen levels as microbes tie up nitrogen during the decomposition of the previous year's crop residue. Points c-f show a time when the microbes are declining and N is being returned to the soil prior to crop uptake for reproduction. Nitrophilic plant growth is accelerated by the additional available nitrogen. Points f-h are attributed to or inferred as a decline in soil nitrogen as crop takes up N for reproduction, eg grain production.

If single point data were collected at points d or e to control nitrogen application, there could be an underapplication since those points fall above the "Mid soil N" line. The time series with its two inflection points provide a more detailed picture of what is happening with nitrogen in the soil. In this example, the selected nitrophilic plant should have its competitive position relative to microbes and crops for nitrogen uptake known to better understand and apply the graph.

Example: Differential Response Based on Root Depth

A further example of controlling a crop care implement based on multiple sentinel plant characteristics is based on environmental characteristics by soil depth. For example, with lab processed soil samples, it is not unusual to provide nutrient results for 0-6", 6-24", and 24-48" (deep root crops like sugar beets). Such has been documented for example at "Agvise Laboratories: Interpreting A Soil Test Report, https://www.agvise.com/wp-content/uploads/2020/08/guide-soil-interpretation-report-2019.pdf."

Figure 7:
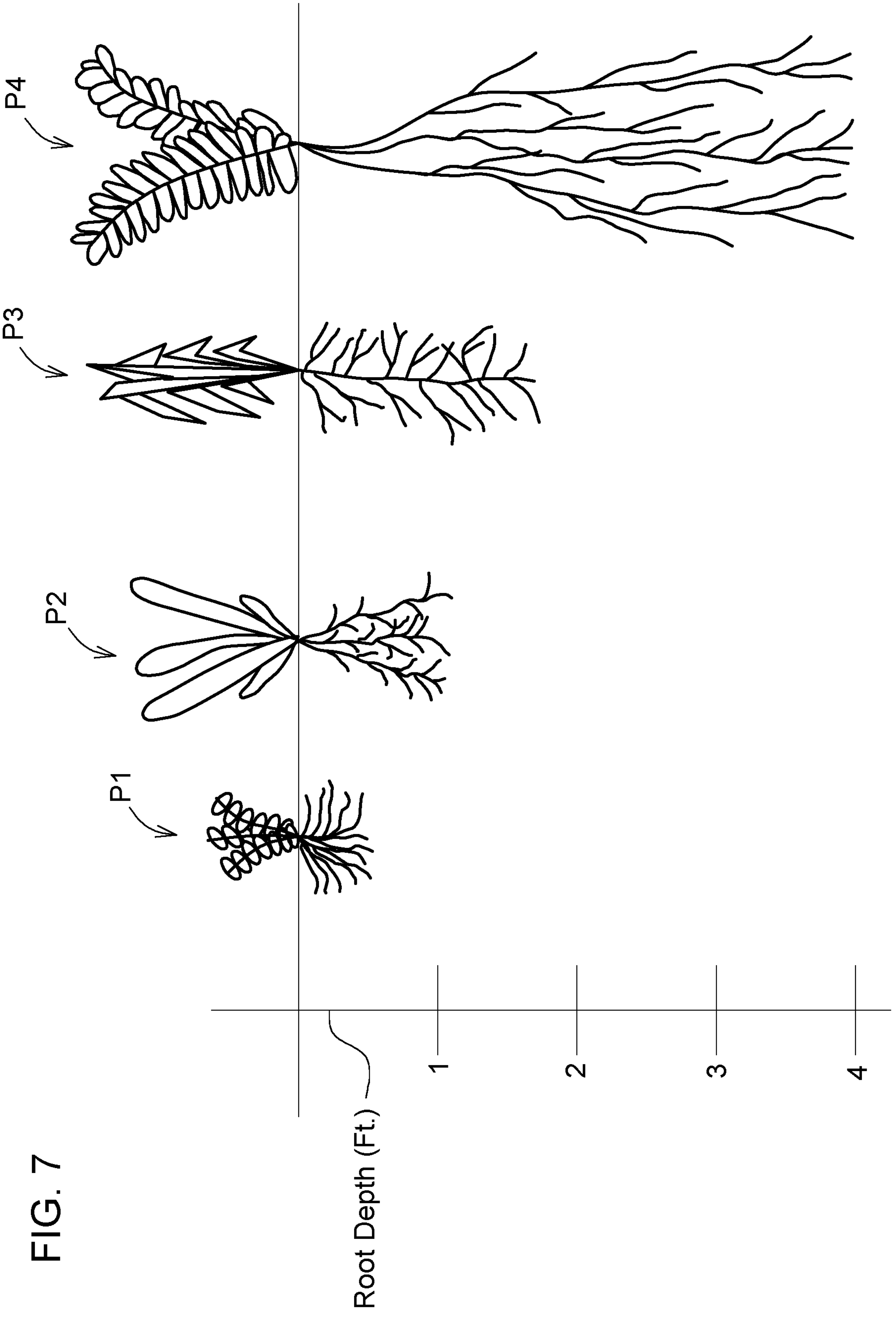
FIG. 7 is a schematic depiction of plants having root structures of different depths.

Similarly, sentinel plants may be used to report on nutrients or soil moisture at different depths by selecting responsive plants with different root depths. In some cases, it may be beneficial to use perennials or fall-seeded sentinels for the deeper information. Sentinels may be chosen not only for root depth, but root breadth. FIG. 7 generally illustrates different plant root structures, not necessarily structures of preferred sentinels. In some examples, sentinels may be genetically engineered to fluoresce or offer other visual or other indication of environmental characteristic or plant stress.

In one example, three different sentinel plants sensitive to nitrogen and having three different root depths are selected. They may be paired with one or more other sentinel plants such as GDD plants as described above. Each of the three nitrogen sentinels could have its own GDD x leaf area x soil nitrogen data. If the sentinels are planted close to each other, there may be competitive interactions to take into account. In this example, the sentinel plants have root systems 6 inches, 12 inches, and 24 inches deep as seen in FIG. 7, and are responsive to nitrogen levels as in the examples above.

In other examples, the three sentinels may be responsive to soil moisture levels. In such examples, the water levels at the three different sentinel plant root depths can be used to infer a soil moisture profile which may be used to control the rotational speed and application rate of a center pivot irrigation system.

The table below illustrates how three sentinel plant types, P1, P2, and P3 can be used together to show soil moisture levels at different depths. In this example, it is assumed that each plant can absorb moisture from its entire root depth range and reports the available soil moisture through at least one characteristic such as amount of protein fluorescence, stem diameter, leaf angle (wilt), leaf area, leaf temperature such as from stomata closure, and other. The different plants may have different reporting characteristics or may have a common reporting characteristic such as green fluorescent protein. In this example, the two reporting levels are "dry" and "moist".

| Root Depth V | T0 | T1 | T2 Water Applied | T3 | T4 |
|---|---|---|---|---|---|
| P1 0-6" | Dry | Dry | Moist | Dry | Dry |
| P2 0-12" | Dry | Dry | Moist | Moist | Dry |
| P3 0-24" | Moist | Dry | Moist | Moist | Dry |

At time T0 the upper 12" of soil are dry as indicated by the moisture stress response of P1 and P2. P3 is able to access moisture from 12-24" soil depths and reports "moist". At time T1 soil moisture in the 12-24" soil depth range has been depleted and P3 now exhibits moisture stress. At time T2 water is applied such as with a center pivot irrigation system. P1, P2, and P3 are all able to take in water and no longer show moisture stress. At time T3 as the applied water evaporates, is absorbed by the sentinel plants and crop, and sinks through the soil profile, the soil in the 0-6" range again becomes dry as reported by P1 which cannot access water at lower soil depths. P2 and P3 can access moisture at lower depths and do not report dry soil conditions through a characteristic. At time T4 all three plants again report dry conditions as the moisture is depleted in the 6" and lower levels. If there was no Dry-Dry-Moist indication as at T0, it can mean that the moisture was used before it reached 12" of soil depth.

This information could be useful to prevent over-irrigation. Suppose a crop has a 9" deep root zone. It would be useful to know that the crop is getting adequate irrigation water (eg not deficient) in the 0-12" range reported by P1, P2, and P3 without excessive amounts of water filtering through the root zone and into depths below as reported by P3. In another phase of irrigation after the growing season, water may be applied to the soil to flush salt and other substances out of the root zone In this case, P3 may be useful in assuring that water is flowing out of the root zone. It may also be useful to have P1-P3 or other sentinel plants with a salt response to monitor the build up of salt during the growing season and salt flushing after the growing season.

In this example the first sentinel plant characteristic 285 may be the dry/moist indication of the plant P1 which is the first sentinel plant 305. Such a dry/moist indication may be referred to as moisture level response. The second sentinel plant characteristic 290 may be dry/moist indication of the plant P2 which is the second sentinel plant 330. A third sentinel plant characteristic may be dry/moist indication of the plant P3 which is a third sentinel plant. The function including the first and second sentinel plant characteristics as variables is represented by the tabular relationships shown in the Table above indicating the relative moisture depth level of the soil. Based on the determined moisture depth level the control system 160 may automatically determine when to add water to the soil by activation of a sprayer of a center pivot irrigation system.

In some instances, the applied water may have a soluble tracer substance that follows the water through the soil profile. The tracer may be directly fluorescent when taken in by the plant or its presence may trigger the production of a fluorescent protein. One or more the sentinels may be responsive to the tracer, providing information on the application timing of water available at a given depth. This filtration rate information may be used for irrigation control. Such use of tracers is documented in Systemic Uptake of Fluorescent Tracers by Soybean (*Glycine max* (L.) Merr.) Seed and Seedlings, Wang et al, Agriculture 2020, Jun. 26, 2020.

Thus it is seen that the apparatus and methods of the present invention readily achieve the ends and advantages mentioned as well as those inherent therein. While certain preferred embodiments have been illustrated and described for the purpose of the present disclosure, numerous changes in the arrangement and construction of the elements and steps may be made by those skilled in the art, which changes are encompassed within the scope of the present invention as defined by the appended claims.

What is claimed is:

1. A method of controlling a crop care implement operating on a surface, the method comprising:

treating a main crop with the crop care implement;

sensing with at least one sensor a first sentinel plant characteristic of a first sentinel plant different from the main crop;

sensing with the at least one sensor a second sentinel plant characteristic of a second sentinel plant different from the main crop, wherein the first and second sentinel plant characteristics are from a first plant genotype and a different second plant genotype, respectively, and wherein the first and second sentinel plant characteristics evidence an environmental condition affecting the main crop, the environmental condition being a condition other than the presence of the first and second sentinel plants;

generating with the at least one sensor first and second sentinel plant characteristic signals indicative of the first and second sentinel plant characteristics;

receiving the first and second sentinel plant characteristic signals with a control system;

automatically determining with the control system an implement action to enhance care of the main crop based on a function including the first and second sentinel plant characteristics as variables, wherein the function is configured such that the implement action is at least in part based on each of the first and second sentinel plant characteristics of the first plant genotype and the different second plant genotype, respectively; and automatically controlling with the control system the implement to execute the implement action at least in part based on each of the first and second sentinel plant characteristics of the first plant genotype and the different second plant genotype, respectively.

2. The method of claim 1, wherein the function is a ratio wherein a numerator is derived from the first sentinel plant characteristic and a denominator is derived from the second sentinel plant characteristic.

3. The method of claim 1, wherein the first sentinel plant characteristic comprises an image of the first sentinel plant, the image including information representative of at least one of a stressor or a magnitude of the stressor of the first sentinel plant or of a response of the plant to the stressor.

4. The method of claim 3, wherein the first sentinel plant characteristic comprises at least one of varying intensities of electromagnetic response generated by the first sentinel plant or a plant growth rate that corresponds to the magnitude of the stressor.

5. The method of claim 1, wherein the first sentinel plant characteristic comprises a chemical marker generated by the first sentinel plant.

6. The method of claim 1, wherein the implement includes an actuator and the implement action comprises applying a substance under rate control of the actuator.

7. The method of claim 1, wherein the first and second sentinel plant characteristics include a leaf area response of a nitrophilic and a non-nitrophilic sentinel plant, respectively.

8. The method of claim 1, wherein the first and second sentinel plant characteristics include a moisture level response of the first sentinel plant and the second sentinel plant, wherein the first and second sentinel plants have root structures of different depths.

9. The method of claim 7, wherein the implement action includes application of nitrogen to the surface.

* * * * *